(12) United States Patent
Mitchell et al.

(10) Patent No.: US 8,632,034 B2
(45) Date of Patent: Jan. 21, 2014

(54) SELF-POWERED DIMMABLE WINDOWS WITH INTEGRATED CONTROLS

(75) Inventors: Bradley J. Mitchell, Snohomish, WA (US); Trevor M. Laib, Woodinville, WA (US); Henry V. Fletcher, Everett, WA (US)

(73) Assignee: The Boeing Company, Chicago, IL (US)

( * ) Notice: Subject to any disclaimer, the term of this patent is extended or adjusted under 35 U.S.C. 154(b) by 794 days.

(21) Appl. No.: 11/690,316

(22) Filed: Mar. 23, 2007

(65) Prior Publication Data

US 2008/0230653 A1 Sep. 25, 2008

(51) Int. Cl.
*B64C 1/14* (2006.01)

(52) U.S. Cl.
USPC ...................................... 244/129.3

(58) Field of Classification Search
USPC .................. 244/129.3, 1 R; 52/786.11, 173.3
See application file for complete search history.

(56) References Cited

U.S. PATENT DOCUMENTS

| | | | |
|---|---|---|---|
| 3,411,131 A | | 11/1968 | Victor |
| 4,564,789 A | | 1/1986 | Kokubu |
| 4,832,468 A | | 5/1989 | Ito et al. |
| 4,868,541 A | | 9/1989 | Sullivan et al. |
| 4,893,062 A | | 1/1990 | D'Aleo et al. |
| 5,029,428 A | * | 7/1991 | Hiraki ............................ 136/251 |
| 5,040,585 A | * | 8/1991 | Hiraki ............................ 160/188 |
| 5,213,626 A | * | 5/1993 | Paetz ............................ 136/244 |
| 6,039,390 A | | 3/2000 | Agrawal et al. |
| 6,055,089 A | * | 4/2000 | Schulz et al. .................. 136/251 |
| 6,316,889 B1 | | 11/2001 | Chansky et al. |
| 6,454,759 B2 | | 9/2002 | Krulevitch et al. |
| 6,493,128 B1 | * | 12/2002 | Agrawal et al. ............ 244/129.3 |
| 7,111,952 B2 | | 9/2006 | Veskovic |
| 7,113,852 B2 | | 9/2006 | Kapadia et al. |
| 2005/0068629 A1 | | 3/2005 | Fernando et al. |
| 2005/0200934 A1 | | 9/2005 | Callahan et al. |
| 2007/0053053 A1 | | 3/2007 | Moskowitz |

FOREIGN PATENT DOCUMENTS

WO WO2007029215 A2 3/2007
WO PCT/US2008/075046 9/2008

OTHER PUBLICATIONS

US Patent and Trademark Office; Office Action for U.S. Appl. No. 11/694,013 dated Apr. 14, 2009.
US Patent and Trademark Office Action; Office Action for U.S. Appl. No. 11/694,013 dated Dec. 8, 2009.
US Patent and Trademark Office; Final Office Action for U.S. Appl. No. 11/694,013 dated Jun. 10, 2010.
US Patent and Trademark Office Office; Office Action for U.S. Appl. No. 11/694,013 datred Nov. 23, 2010.

(Continued)

*Primary Examiner* — Tien Dinh
*Assistant Examiner* — Richard R Green
(74) *Attorney, Agent, or Firm* — Parsons Behle & Latimer (57) ABSTRACT

An electrically controlled dimmable window for aircraft includes a controller and power that eliminates the need for wiring connections to on-board systems. The controller is integrated into the sidewall in which the window is mounted. Power for controlling the window is derived from an energy harvesting device that generates power by converting thermal gradients, motion/vibration or light energy present near the window. The integrated controller includes passenger controls for adjusting the opacity of the window, power conditioning circuitry, an electrical power storage device such as a battery, a processor and a radio receiver. The window can be remotely controlled by a cabin attendant from a central controller that transmits window control signals to the radio receiver.

24 Claims, 6 Drawing Sheets

(56) References Cited

OTHER PUBLICATIONS

US Patent and Trademark Office; Final Office Action for U.S. Appl. No. 11/694,013 dated Jun. 9, 2011.
US Patent and Trademark Office; Office Action for U.S. Appl. No. 11/694,013 dated Feb. 15, 2012.
Combined Search and Exam Report for GB0804804.3 dated May 23, 2008.
US Patent and Trademark Office; Office Action for U.S. Appl. No. 11/6862,395 dated Oct. 6, 2011.
US Patent and Trademark Office; Office Action for U.S. Appl. No. 11/6862,395 dated Nov. 2, 2012.

* cited by examiner

SELF-POWERED DIMMABLE WINDOWS WITH INTEGRATED CONTROLS

TECHNICAL FIELD

This disclosure generally relates to electrically dimmable windows, and deals more particularly with a dimmable window having an integrated power supply and control system.

BACKGROUND

Electrically dimmable windows have been proposed for use in aircraft to replace conventional window shades. These windows rely on electric power applied to special materials in the windows in order to change or sustain window opacity.

The use of electrically dimmable windows in aircraft increase electrical power demands on on-board systems, and also require wiring to connect each window with the aircraft's electrical power supply system. The need for this additional wiring renders it costly, and sometimes impractical to retrofit existing aircraft with electrically dimmable windows. Moreover, where it is desired to provide central control of all of the windows in the aircraft by a pilot or cabin attendant, it is necessary to connect an additional set of control wiring between the windows and a controller.

Accordingly, there is a need for dimmable windows for vehicles such as aircraft that overcome the problems mentioned above. The present disclosure is intended to satisfy this need.

SUMMARY

Illustrated embodiments of the disclosure provide a self-powered, dimmable window system having integrated controls that reduce wiring requirements to facilitate installation, particularly in retrofit applications, for aircraft. The dimmable windows are powered by energy harvesting devices on-board the aircraft that convert thermal gradients, light or motion into electrical power. Window controls integrate a processor, power conditioning circuits and an electric power storage device in a single module that can be mounted adjacent each window, such as on a sidewall panel.

In accordance with one disclosed embodiment, a dimmable window system is provided for vehicles, comprising: a sidewall having at least one window opening; an electrically dimmable window mounted in the window opening on the sidewall; a device for harvesting energy on-board the vehicle; and, a controller mounted on the sidewall for controlling the opacity of the associated window using the energy harvested by the energy harvesting device. The controller includes a storage device for storing energy harvested by the harvesting device, and a processor for controlling the operation of the window. The controller may further include a radio receiver for receiving radio signals for controlling the operation of the window. The energy harvesting device may include a photovoltaic device mounted on or near the sidewall for converting ambient light into electrical power. The photovoltaic device may be mounted on or along an edge of a window to collect natural or artificial light.

In accordance with another embodiment, a sidewall assembly for aircraft is provided, comprising: a sidewall panel; an electrically dimmable window mounted on the sidewall panel; and, a control module mounted on the sidewall panel for powering and controlling the operation of the dimmable window, wherein the control module includes a device for storing electrical energy used to control the dimmable window. The sidewall assembly may further comprise a device for harvesting energy on-board the aircraft and for converting the harvested energy into electrical power that is stored in the storage device. The control module may include a processor for controlling the application of electrical power to the window, a circuit for conditioning the electrical power produced by the harvesting device and a radio receiver for wirelessly receiving control signals used to control the operation of the window.

According to a further embodiment of the disclosure, a self-powered electrically dimmable window assembly is provided for aircraft, comprising: a dimmable window having electrically controlled opacity; an energy harvesting device for harvesting energy on-board the aircraft and converting the harvested energy to electrical power; a device for storing the electrical power harvested by the harvesting device; and, a controller for controlling the opacity of the dimmable window using electrical power stored in the storage device. The energy harvesting device may include a thermoelectric device, a photovoltaic device or a piezoelectric device. The storage device may comprise a battery or an electrical capacitor. The processor and energy storage device may be contained in a housing module.

According to still another embodiment of the disclosure, a sidewall panel assembly for aircraft is provided, comprising: a sidewall panel having at least one window opening therein; an electrically dimmable window mounted on the sidewall panel within the opening; a photovoltaic device for converting ambient light into electrical power; and, a controller for controlling the operation of the dimmable window using electrical power produced by the photovoltaic device. The sidewall assembly may further include a device for storing electrical power produced by the photovoltaic device. The controller may include a set of manually operable passenger switches for selecting a dimming setting for the window, and a processor for controlling the electrical power delivered to the window based on the dimming setting selected by the passenger. The sidewall assembly may further comprise a radio receiver for wirelessly receiving remote control signals used by the processor to control the dimmable window.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
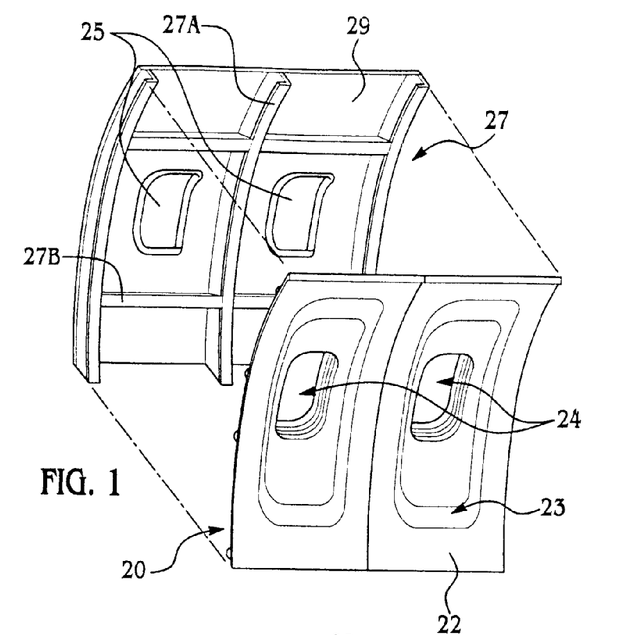
FIG. 1 is a perspective illustration of a typical sidewall panel, showing its orientation relative to the interior of an aircraft fuselage.
Figure 2:
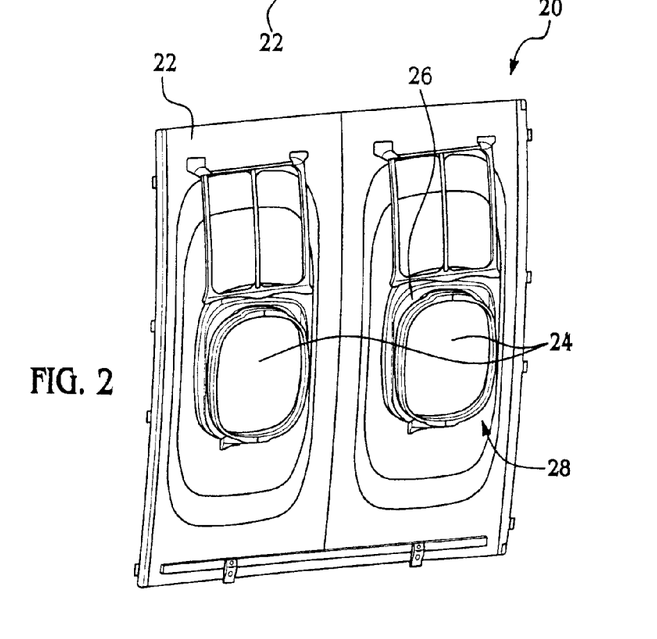
FIG. 2 is a perspective illustration of the outboard face of the sidewall panel shown in FIG. 1.
Figure 3:
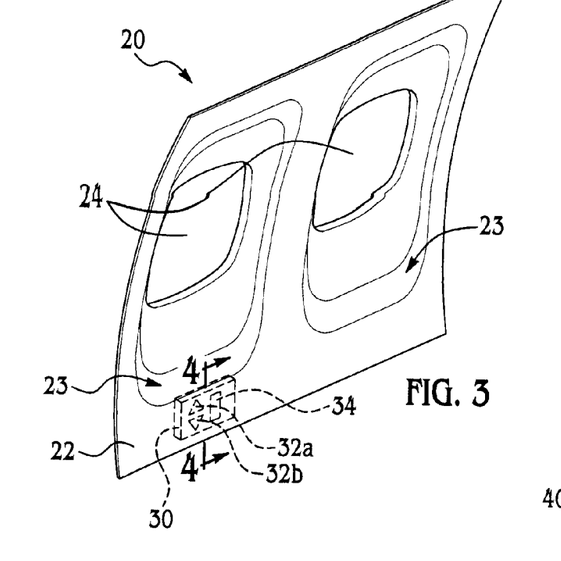
FIG. 3 is a perspective illustration of the sidewall panel shown in FIGS. 1 and 2, and depicting the position of passenger switches for controlling a dimmable window.

Referring first to FIGS. 1-3, a sidewall panel assembly 20 is secured to an airframe 27 formed of vertical and horizontal frame members 27a, 27b, respectively. An outer skin 29 is formed over the airframe 27 and includes a structural window assembly 25. The sidewall panel assembly 20 includes a curved sidewall panel 22 having a decorative inside face exposed to an interior cabin environment. The inside face of panel 22 may include interior window assemblies 24 which are secured to the panel 22 by upper clips 26 and a lower latch pawl 28.

Figure 7:
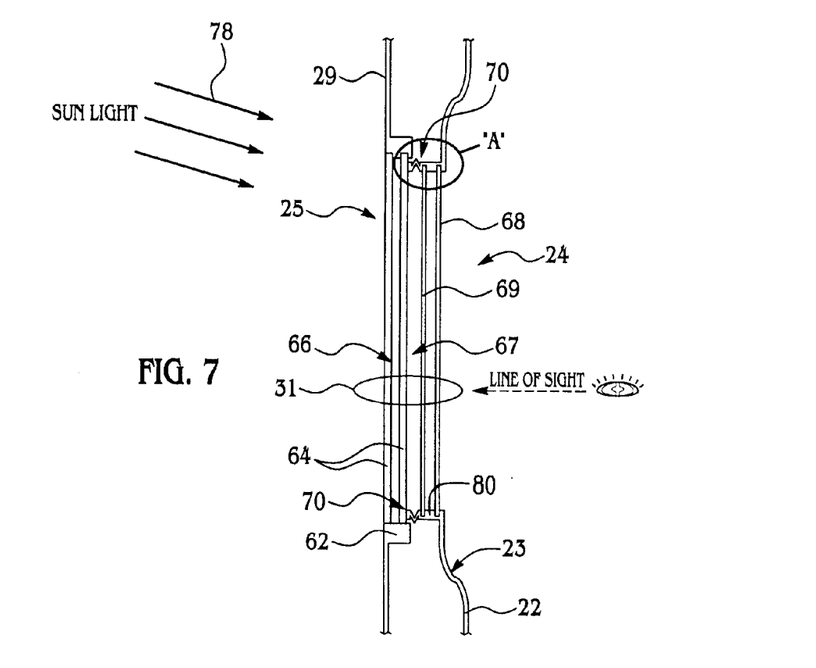
FIG. 7 is a sectional illustration of a window assembly forming part of the sidewall panel.

As shown in FIG. 7, the combination of window assemblies 24, 25 form a window build up 31. The structural window assembly 25 comprises two structural window panes 64, optionally separated by an airspace 66 and held within a frame 62 forming part of the outer skin 29. The interior window assembly 24 includes an inner decorative window or "dust cover" 68 mounted in a window frame opening 80 formed integrally with the window reveal 23. A dimmable window 69 having electrically controlled opacity is mounted in the window frame 80, between the inner decorative window 68 and the structural window assembly 25. A rubber boot or seal 70 extends between the window frame 80 and one of the structural windows 64 so as to seal the air gap 67 between the dimmable window 69 and the structural window assembly 25. It should be noted here that the arrangement shown in FIG. 7 is merely illustrative and that the dimmable window 69 may be placed at other locations in the window build up 31, if desired.

As will be discussed in more detail below, the dimmable window 69 forms part of a dimmable window system that is integrated into the sidewall panel assembly 20 and includes a integrated, energy harvesting device that supplies power to the dimmable window 69, as well as a low power, wireless control circuit that allows control of the dimmable window 69 from a remote location. Essentially no electrical power is required to hold the dimmable window 69 in a selected opacity state, and no wiring external to the sidewall panel assembly 20 is required to power or control the dimmable window 69.

The dimmable window 69 may be constructed using any of various known technologies, including those using an electrochromatic membrane which changes opacity in response to an applied electric charge. The electric charge, and thus the opacity of the window 69, may be varied by applying a voltage of positive or negative polarity across the membrane. In one embodiment, the window 69 holds its opacity state when no electric charge is applied to the membrane. Typically, the window 69 increases its opacity when an electrical voltage is applied of one polarity, and decreases its opacity when an electrical voltage is applied of the opposite polarity. In effect, the dimmable window 69 may be thought of as a large capacitor whose electric charge may be varied. In one useful embodiment, applying one range of voltages drives the window 69 towards greater transparency, and applying another range of voltages drives the window 69 towards greater opacity.

Figure 6:
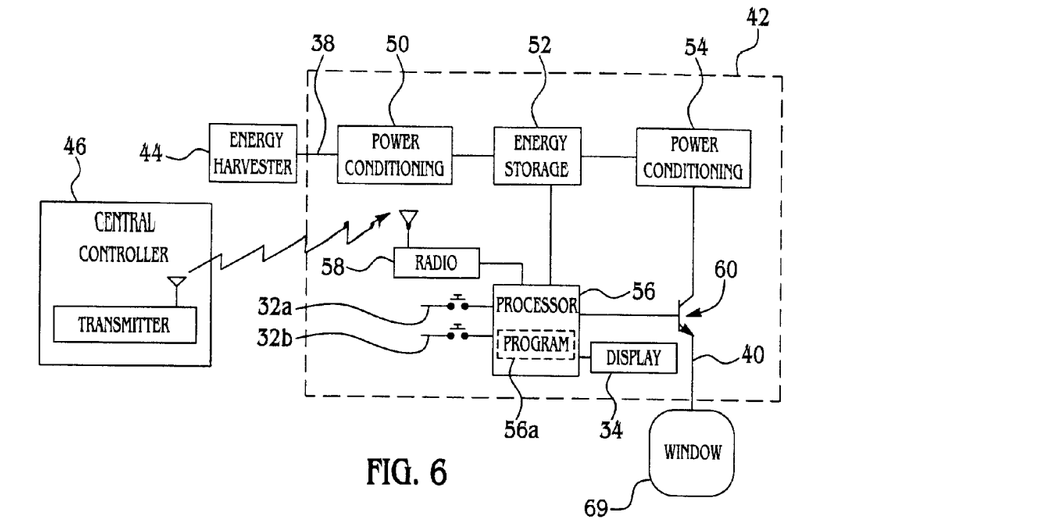
FIG. 6 is a combined block and schematic illustration of a self-powered, electrically dimmable window according to an embodiment of the invention, shown in relation to a central controller.

Referring now to FIG. 6, the self-powered dimmable window system includes a controller 42 that controls the application of electrical power to the window 69 which is powered by an energy harvesting device 44 on-board the aircraft. The energy harvesting device 44 may comprise, by way of example and without limitation, a thermoelectric energy harvesting device that generates electrical power from a thermal gradient on-board the aircraft. The thermoelectric energy harvesting device 44 may be placed between two solid materials of different temperatures or between a solid and a fluid at different temperatures to generate electricity. In the case of an aircraft, such surfaces include the aircraft fuselage structure, the aircraft window frame structure, the window exterior surface, various window inner panes (including the electrochromatic dimming window surface itself), the sidewall panel 22 and heat sinks (not shown) that may be placed in airspaces such as between the sidewall panel 22 and an insulation blanket or the airspaces between window panes 64, 68, 69 (FIG. 7). These thermoelectric devices take advantage of the temperature extremes experienced by the aircraft while cruising at high altitudes, and to a lesser degree, during warm days and nights while on the ground.

Other types of energy harvesting devices 44 are contemplated. For example, photovoltaic devices may be employed that convert light energy into electricity. Sources of light near passenger windows on aircraft include solar radiation and ambient cabin lighting. Piezoelectric or electrodynamic devices may also be used to harvest energy, by converting vibration and motion energy into electricity. Vibration/motion energy exists near passenger windows in the form of aircraft skin vibration, sidewall panel vibration and aircraft turbulence motion.

The controller 42 includes passenger controls in the form of push button switches 32a, 32b that are mounted on the sidewall panel 22 adjacent a window reveal 23 surrounding window assembly 24. A display 34, which may be an LCD for example, provides the passenger with visual confirmation of the opacity setting of the adjacent dimmable window 69. Thus, each of the passengers adjacent one of the window assemblies 24 may independently adjust the window opacity using individual passenger controls. Alternatively, the window 69 may be remotely controlled by a central controller 46 on-board the aircraft by a pilot or cabin attendant. Accordingly, a pilot or cabin attendant may override opacity settings selected by passengers so as to fully dim or lighten all of the windows 69 in order to prepare the aircraft for landing or takeoff, or for the comfort of passengers, as where the cabin needs to be dimmed to allow passengers to sleep or view a movie. The central controller 46 includes a radio transmitter 48 (or transceiver) that wirelessly transmits control signals to the controller 42, thus obviating the need for wiring to connect the control circuit 42 to the central controller 46.

The controller 42 broadly includes a first power conditioning circuit 50, an energy storage device 52, a second power conditioning circuit 54, a processor 56 having a software program 56*a*, a radio receiver 58 (or transceiver), a switching transistor or other electrical control device 60 and the passenger control buttons 32*a*, and 32*b*. The power conditioning circuit 50 receives electrical power from the energy harvesting device 44 and functions to condition this power and trickle charge the energy storing device 52. The power conditioning circuit 54 is used to condition power applied to the window 69, such as to provide power and specific voltages used to control the opacity of the window 69. The processor 56 controls the flow of electrical power from the storage device 52 to the window 69 using electrical control device 60 as a switch.

The energy storing device 52 may comprise a rechargeable battery or a super-capacitor, for example, that stores electrical power generated by the energy harvester device 44 until it is drawn by the processor 56 to change the opacity state of the window 69.

The software program 56*a* comprises a set of instructions that cause the processor 56 to operate in any of several modes, including a sleep mode in which minimal electrical power is drawn from the storage device 52. These programmed instructions may cause the processor 56 to periodically awaken from the sleep mode to check for broadcast radio signals from the central controller 46. When awakened, the processor 56 temporarily powers up the radio receiver 58 to listen for the transmitted signals, and if such signals are received, then the processor carries out the instructions contained in the transmitted message. These instructions may include, by way of example and without limitation, setting the window 69 to minimum opacity, setting the window 69 to maximum opacity, changing the passenger control set points or switching into a power down mode. The software program 56*a* also controls the processor 56 to operate in a passenger control mode in which the processor 56 awakens anytime a passenger presses one of the passenger control buttons 32*a*, 32*b*. When awakened, the processor 56 begins changing the opacity of the window 69 in the direction corresponding to the particular button 32*a*, 32*b* that has been pressed.

The processor 56 may also operate in a power down mode controlled by the software program 56*a*. The power down mode may be entered, for example, when passenger control of window 69 is not necessary or desired, as between flights or when the aircraft is in storage. The processor 56 may perform self checks on the status or operation of the dimmable window system. Where the radio 58 comprises a transceiver, the results of a self-check can be transmitted by the radio 58 to the central controller 46.

Figure 4:
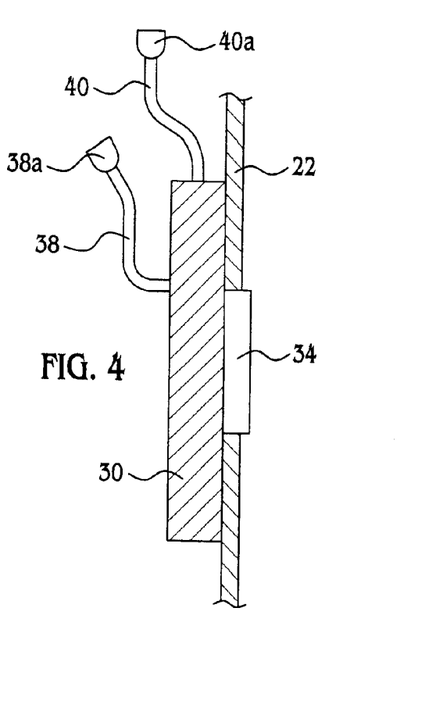
FIG. 4 is a sectional illustration taken along the line 4-4 in FIG. 3.
Figure 5:
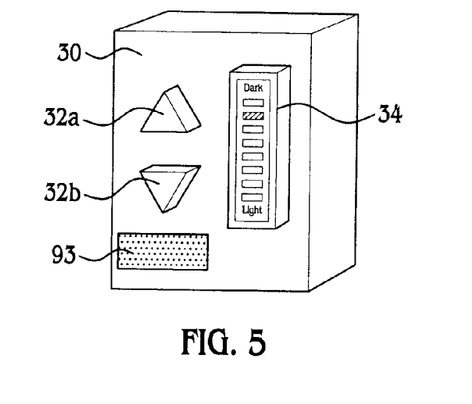
FIG. 5 is a perspective illustration of the passenger controls shown in FIGS. 3 and 4.

As best seen in FIGS. 3, 4 and 5, the entire controller 42 may be placed on one or more printed circuit boards (not shown) and integrated into a single control module 30 which can be mounted, for example, on the outboard face of the sidewall panel 22. The controller module 30 includes a first electrical cable 38 having a connector 38*a* that connects the controller 42 to the energy harvester 44. The control module 30 has a second electrical cable 40 provided with a connector 40*a* that connects the controller 42 to the window 69. Other embodiments for packaging the controller 42 are possible. For example, either the radio receiver 58 and/or the energy storage device 52 may be placed in separate modular housings and mounted on the outboard face of the sidewall panel 22, or other locations between the sidewall panel assembly 20 and the outer skin 29. In the illustrated embodiment, both the passenger setting buttons 32*a*, 32*b* and the opacity setting display 34 are incorporated into the controller module 30 and extend through openings in the sidewall panel 22 so as to be viewed and accessed by the passenger. Other packaging arrangements for the passenger controls 32*a*, 32*b* and display 34 are possible.

From the above description, it may be appreciated that the self-powered dimmable window system can be integrated into sidewall panel assemblies 20, along with concealed energy harvesting devices 44 and low power, wireless radio receivers/transceivers 58. Thus, the self-powered dimmable window system may be installed as a unit on the sidewall panel assembly 20 without the need for installing wires to provide electrical power or control for the dimmable window 69. These features make the self-powered dimmable window system particularly well suited for retrofit applications, where the addition of dimmable windows would otherwise require stringing costly wiring through the cabin of the aircraft.

The passenger display 34 may use any of various technologies such as LEDs or LCDs. However, in order to minimize power drain from the storage device 52, LCD displays are preferred. For example, a clear LCD may be used that is provided with a reflective colored background surface. This type of display mimics the effect of a colored LED, without consuming power. The passenger display 34 may also comprise an electrophoretic display.

It should be noted here that in the illustrated embodiment, a single controller 42 has been shown as controlling a single window 69. However, as shown in FIGS. 1-3, each sidewall panel 20 typically includes a pair of window build-ups 31, thus it is possible, for a single controller 42 to operate a pair of the dimmable windows 69 mounted in a single sidewall panel assembly 20. In those cases where a single controller 42 operates a pair of windows 69, a pair of passenger interfaces (switches 32*a*, 32*b* and display 34) may be employed.

As previously indicated, the energy harvesting device 44 may comprise a thermoelectric device. In one example, the thermoelectric device may be mounted to a crease beam in the aircraft, and cabin air flowing through the return air grill blows across a heat exchanger. During aircraft cruise, the temperature difference across the thermoelectric device generates sufficient power to charge a capacitor or storage battery forming the energy storage device 52, required to power the dimmable window 69. The thermoelectric device and heat exchanger described above may be temporarily attached to the bottom edge of the sidewall panel 22 during build-up of the sidewall panel assembly 20.

After the sidewall panel assembly 20 is mounted on the aircraft, the thermoelectric device and the heat exchanger may be removed from the bottom edge of the sidewall panel 22 and attached to the aircraft's crease beam. A connector (not shown) may be provided between the thermoelectric device and the sidewall panel 22 to enable the thermoelectric device and the sidewall panel 22 to be installed/uninstalled together, or separately. It is possible to power two of the dimmable windows 69 using a single thermoelectric device as described above. In some applications, a single, larger thermoelectric device may be used to power two dimmable windows 69 with greater efficiency, and less weight, compared to two smaller thermoelectric devices each sized to run a single window 69.

The use of photovoltaic devices for powering the dimmable windows 69 may be especially desirable in some applications because of the ready availability of ambient natural and artificial light in the aircraft cabin. Moreover, photovoltaic devices may be integrated into the sidewall panels 20, thus minimizing the wiring required to connect the energy harvesting device 44 with the controller 42. Since photovoltaic devices are generally dark blue or black in color they may not blend esthetically with the cabin interior of some aircraft. Accordingly, it may be desirable to reduce the visual impact of photovoltaic devices in the passenger window area by placing the devices out of sight of passengers or integrating them into portions of the sidewall panel 22 so that they are not highly noticeable. For example, photovoltaic devices may be hidden in areas of the window build-up 31 so that they are not visible to passengers but yet have a line of sight to a light source such as sunlight external to the airplane.

Figure 8:
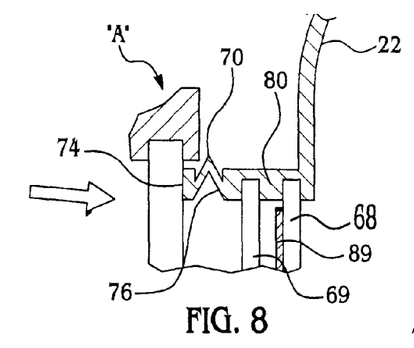
FIG. 8 is an enlarged illustration of the area designated as "A" in FIG. 7.

Referring to FIGS. 7 and 8, a pair of photovoltaic devices 74, 76 may be placed on folds of the rubber boot 70 so that sunlight 78 impinges upon the two devices 74, 76 while being hidden from the line of sight 72 of a passenger. Although a pair of the devices 74, 76 have been illustrated in the drawings, either one, or both of the devices 74, 76 may be used.

Figure 9:
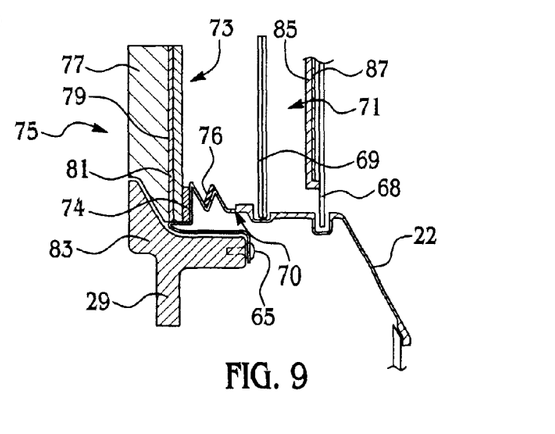
FIG. 9 is a sectional illustration of an alternate form of a window assembly.

FIG. 9 shows an alternate form of a window construction in which a single outer structural window 75 is held in a frame 83 formed integral with the aircraft's outer skin 29. The structural window 75 comprises a pane 77 of laminated glass bonded to a fail safe pane 81 and a gel interlayer 79. Photovoltaic devices 74, 76 are placed within folds of a rubber boot 70 that seals the air gap 73 between the structural window 75 and the dimmable window 69. The rubber boot 76 is secured to the frame 83 by fasteners 65.

In some applications, aircraft may be equipped with motorized blinds 85, as shown in FIG. 9, which are mounted inboard of the inner dust cover pane 68. A photovoltaic device 87 may be mounted on the outboard face of the blind 85 so as to receive sunlight passing through the window opening.

The photovoltaic device may comprise a transparent or semitransparent layer or coating 89 applied to one or more faces of one of the windows, such as the outboard face of the dust cover pane 68 shown in FIG. 8.

Figure 10:
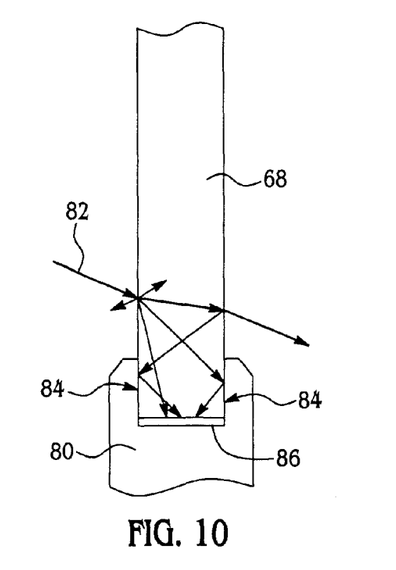
FIG. 10 is a sectional illustration of a window employing a light guide and photovoltaic device for harvesting energy.

FIG. 10 shows a photovoltaic device 86 mounted at the bottom of a groove in the frame 80, along the outer edge of the dust cover pane 68. As the light 82 enters the dust cover pane 68, a portion of its energy is diffracted, diffused and reflected within the window pane 68 so that some of the light energy reaches the edge of the pane 68. Reflective surfaces 84, which may comprise silver coatings, are formed on that portion of the dust cover 68 within frame 80, act as a light guide for light rays reaching near the edge of the dust cover pane 68. The reflective surfaces 84 "guide" the light onto the photovoltaic device 86. Both the reflective surfaces 84 and the photovoltaic device 86 may be preinstalled in the frame 80 before the dust cover pane 68 is installed. The photovoltaic device 86 may be placed at each surface interface between the bezel frame 80 and the dust cover pane 68. The reflective silvered surfaces 84 may be placed at other locations in the window buildup 31 shown in FIG. 7, for example to guide ambient light onto photovoltaic devices that are out of the passenger's line of sight.

Figure 11:
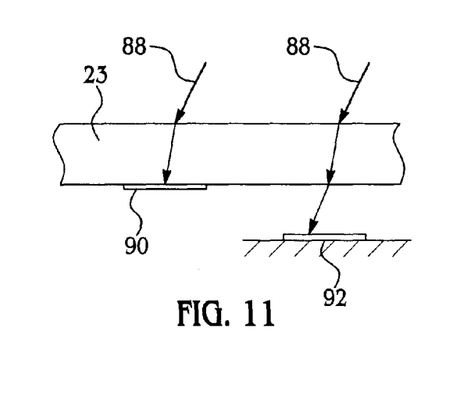
FIG. 11 is a sectional illustration of a portion of a sidewall panel having photovoltaic devices for generating electrical power.

FIG. 11 shows a portion of the window reveal 23 which is formed of light transmissive material, that may be either transparent or translucent material, so that light 88 impinging upon the reveal 23 passes through the thickness of the reveal 23 onto a photovoltaic device 90 mounted on the bottom face of the reveal 23, or onto a photovoltaic device 92 that is mounted on a surface somewhere beneath the reveal 23. In this embodiment, the area of the reveal 23 surrounding the transparent portion overlying photovoltaic devices 90, 92 may be painted a dark color so as to blend with the color of the photovoltaic devices 90, 92. In this manner, the devices 90, 92 will not stand out visually as shadows beneath the transparent portion of the reveal 23. It should be noted here that the reveal 23 may also be made of a transparent material having a translucent surface treatment.

Figure 12:
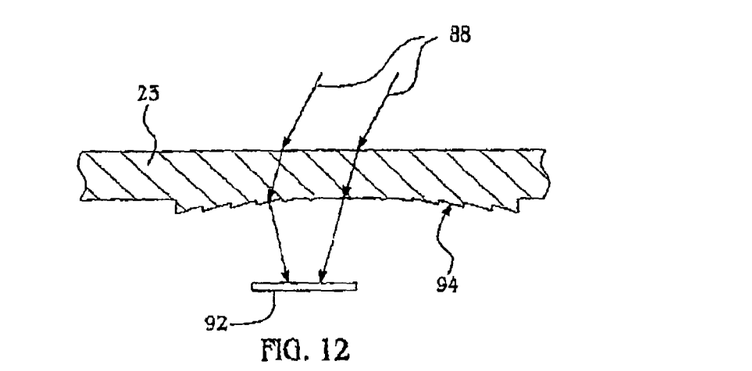
FIG. 12 is a view similar to FIG. 11 but depicting the use of an integrally formed optical element for concentrating light rays on the photovoltaic device.

Referring now to FIG. 12, the efficiency of the embodiment shown in FIG. 11 may be optimized by forming an optical element such as a Fresnel lens 94 in the bottom face of the reveal 23 which focuses (concentrates) incident light 88 onto a photovoltaic device 92. The Fresnel lens 94 may be manufactured, for example, by injection molding a Fresnel pattern into the reveal 23. A translucent surface treatment may be applied to the visible surfaces of the reveal 23 in order to mask the Fresnel lens 94 and the device 92 from passenger view.

Figure 13:
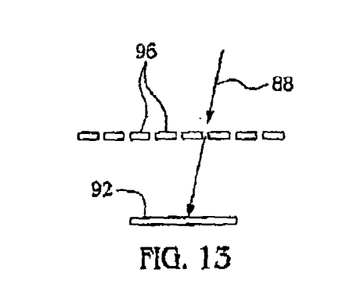
FIG. 13 is a diagrammatic illustration showing the use of openings in the sidewall panel to allow light to impinge on a photovoltaic device.

Photovoltaic devices may be hidden from passenger view by forming the window reveal 23 from finely perforated material 96, as shown in FIG. 13. The photovoltaic device 92 may be hidden beneath the finely perforated material 96, and the remainder of the surface on the reveal 23 may be colored to match the remainder of the reveal 23 surrounding the perforated material 96. The perforated material 96 may comprise a mesh, expanded metal or plastic, or holes formed in the reveal 23 by drilling, cutting or molding.

Figure 14:
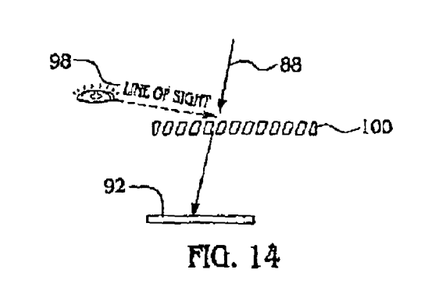
FIG. 14 is an illustration similar to FIG. 13 but showing the openings aligned with a source of light.

As shown in FIG. 14, the holes or perforations in the perforated material 100 may have a depth and angular orientation that is aligned with a source of light 88 so that the depth of the perforations in the material 100 block the line of sight 98 of passengers, causing the photovoltaic device 92 to be hidden from passenger view.

Figure 15:
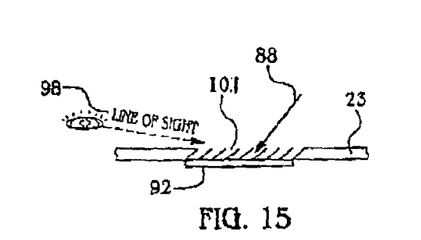
FIG. 15 is a diagrammatic illustration showing the use of louvers in a sidewall panel to cover a photovoltaic device.

FIG. 15 illustrates another embodiment, in which a series of fine louvers 101 are formed in or over the reveal 23, covering a photovoltaic device 92. The louvers 102 are angularly oriented so as to be aligned with incident light 88, but block the line of sight 98 of passengers. The louvers 101 may be fabricated on a very small scale such that the louvered surface of the reveal 23 appears as a series of decorative grooves or surface patterns.

Figure 16:
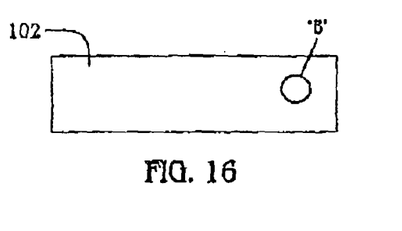
FIG. 16 illustrates a photovoltaic device incorporated as a decorative surface on the sidewall panel, including a mask.
Figure 17:
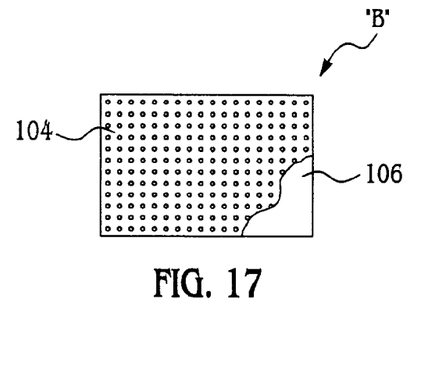
FIG. 17 is an enlarged illustration of the area designated as "B" in FIG. 16, better illustrating the mask.

Referring now to FIGS. 16 and 17, a photovoltaic device 106 underlying a reveal 23 may be masked by fabricating the entire reveal 23 from a material having a surface 102 that is similar in appearance to the photovoltaic device 106. The surface 102 which overlies the photovoltaic device 106 may be made brighter and closer to the appearance of the remainder of the cabin interior by overlaying a pattern 104 of white dots onto the dark surface 102. Although the application of the pattern 104 may reduce the efficiency of the photovoltaic device 106 somewhat, the device 106 may nevertheless produce sufficient power to satisfactorily operate the dimmable window 69.

In another embodiment, as shown in FIG. 5, a photovoltaic device 93 may be integrated into the control module 30 so that when the control module 30 is mounted on the backside of the sidewall panel 22, the device extends through an opening in the panel 22 so as to be exposed to ambient light within the cabin. Alternatively, the photovoltaic device 93 may be disposed behind a translucent portion of the sidewall panel 22 so that light passing through the translucent portion of the sidewall panel 22 impinges upon the device 93. As another alternative, the control buttons 32, display 34, or the forward face of control module 30 may be made of a translucent material with the photovoltaic device 93 disposed behind these translucent areas. This embodiment has the advantage of eliminating wiring between the control module 30 and the device 93.

One or more photovoltaic devices may be formed on or within the reveal 23 or surrounding area, within the line of sight of passengers, if it is formed of the same color as the surrounding elements. For example, a photovoltaic device that is sensitive to non-visible light may be painted in a color that allows light to pass at non-visible wavelengths to which the photovoltaic device is sensitive.

Figure 18:
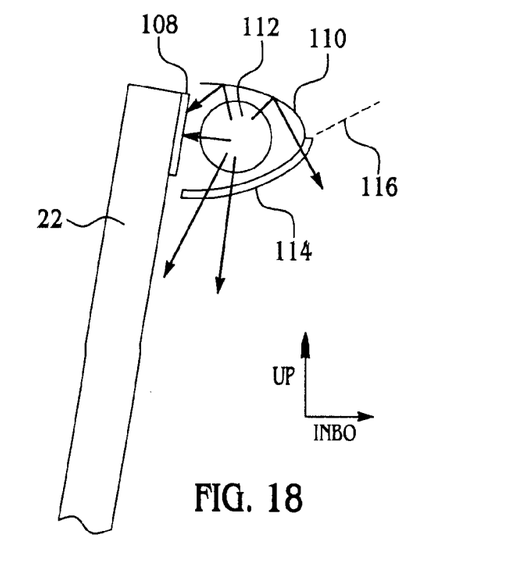
FIG. 18 is a side illustration of the top edge of a sidewall panel, showing a photovoltaic device positioned near a sidewall wash light.

Attention is now directed to FIG. 18 wherein a photovoltaic device 108 is mounted near the top of a sidewall panel 22, facing a sidewall wash light 112 that is provided with a reflector 110 and a lens/cover 114. The location of an air distribution nozzle, passenger service unit or overhead storage bin is indicated at 116. The wash light 112 may be florescent or LED lights which direct light onto the photovoltaic device 108 that is hidden from passengers' line of sight by the lens/cover 114.

Figure 19:
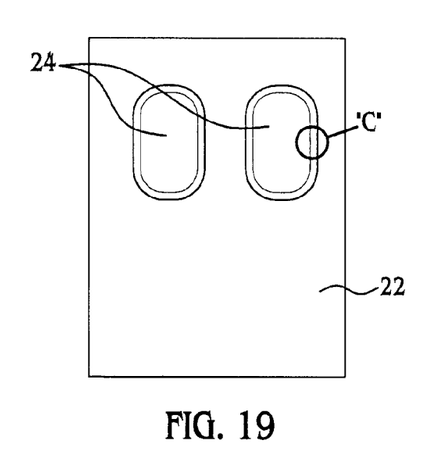
FIG. 19 is an elevational illustration of a sidewall panel, showing photovoltaic devices formed on the surface of the windows.
Figure 20:
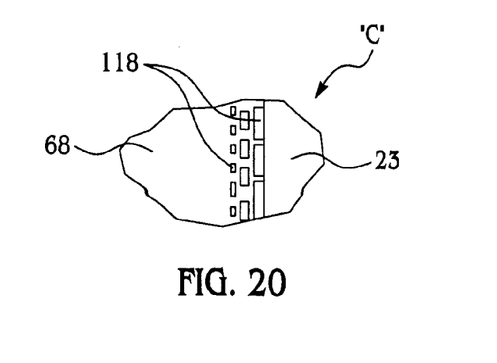
FIG. 20 is an enlarged illustration of the area designated as "C" in FIG. 19.

FIGS. 19 and 20 illustrate the use of photovoltaic patches 118 applied around the periphery of one of the window panes in the window build-up 31, for example the dust cover pane 68. The patches 118 are applied such they form an attractive, non-obvious pattern around the periphery of the pane 68. Transparent conductors (not shown) may be used to interconnect the patches 118.

Although the embodiments of this disclosure have been described with respect to certain exemplary embodiments, it is to be understood that the specific embodiments are for purposes of illustration and not limitation, as other variations will occur to those of skill in the art. For example, although the self-powered dimmable window system has been disclosed in connection with its application to aircraft, the system can be employed in other types of vehicles and in stationary applications such as in buildings.

What is claimed is:

1. A dimmable window system for a vehicle, comprising:
   a sidewall panel assembly having at least one window opening;
   an electrically dimmable window mounted in the window opening on the sidewall panel;
   an inner window mounted within the window opening, inside of the dimmable window;
   a pair of photovoltaic energy harvesting devices for converting ambient light into electrical power;
   a seal comprising a boot surrounding the window opening and configured to seal an air gap between the dimmable window and an outer window of the vehicle, wherein the pair of photovoltaic energy harvesting devices are placed within folds of the boot within the air gap and substantially hidden from a line of sight of a person in an interior of the vehicle; and,
   a controller mounted in proximity to the dimmable window for controlling the opacity of the dimmable window using only the energy harvested by the energy harvesting device;
   all wiring associated with powering and controlling said dimmable window is internal to said sidewall panel assembly.

2. The dimmable window system of claim 1, wherein the controller includes a storage device for storing energy harvested by the energy harvesting device.

3. The dimmable window system of claim 2, wherein the controller includes:
   a processor for controlling the operation of the window, and
   an enclosure covering the processor and the energy storage device.

4. The dimmable window system of claim 1, wherein the controller includes a radio receiver for receiving radio signals for controlling the operation of the dimmable window.

5. The dimmable window system of claim 1, wherein the controller includes a window dimming adjustment control on the sidewall for selecting a level of opacity of the window.

6. The dimmable window system of claim 1, wherein:
   the sidewall includes an inboard face exposed to the interior of the vehicle and an outboard face, and
   the controller is mounted on the outboard face of the sidewall.

7. The dimmable window system of claim 1, wherein the controller is mounted on the sidewall.

8. A sidewall assembly for aircraft, comprising:
   a sidewall panel having a window opening;
   an electrically dimmable window mounted in the window opening on the sidewall panel;
   an inner window mounted within the window opening, inside of the dimmable window;
   a seal comprising a boot surrounding the window opening and configured to seal an air gap between the dimmable window and an outer window of the aircraft;
   a pair of photovoltaic energy harvesting devices, placed within folds of the boot within the air gap and substantially hidden from a line of sight of a person in an interior of the aircraft, configured for converting ambient light into electrical power; and
   a control module connected with the sidewall panel for powering and controlling the operation of the dimmable window, the control module including a device for storing electrical energy used to control the dimmable window, said dimmable window controlled by using only energy harvested by the photovoltaic energy harvesting device;
   all wiring associated with powering and controlling said dimmable window is internal to said sidewall panel assembly.

9. The sidewall assembly of claim 8, further comprising said energy harvesting device coupled with the control module for harvesting energy on-board the aircraft and converting the harvested energy into electrical power.

10. The sidewall assembly system of claim 8, wherein the control module includes a processor for controlling the application of electrical power to the dimmable window from the storage device.

11. The sidewall assembly of claim 8, wherein the control module includes a circuit for conditioning electrical power delivered to the dimmable window from the storage device.

12. The sidewall assembly of claim 8, wherein the control module includes a radio receiver for wirelessly receiving control signals used to control the operation of the dimmable window.

13. The sidewall assembly of claim 8, wherein:
   the sidewall panel includes an inboard face exposed to the interior of the aircraft, and an outboard face, and
   the control module is mounted on the outboard face of the sidewall panel.

14. A self-powered, electrically dimmable window assembly for aircraft, comprising:
   a dimmable window having electrically controlled opacity;
   outer and inner windows mounted on opposite sides of the dimmable window;
   a seal comprising a boot that seals an air gap between the dimmable window and the outer window;
   a photovoltaic energy harvesting device placed within folds of the boot in the air gap and substantially hidden from a line of sight of a person in an interior of the aircraft, configured for harvesting energy on-board the aircraft and converting the harvested energy to electrical power;
   a device for storing the electrical power harvested by the energy harvesting device; and, a controller for controlling the opacity of the dimmable window using only said harvested electrical power stored in the storage device;

said dimmable window comprises a sidewall panel assembly and all wiring associated with powering and controlling said dimmable window is associated only with said dimmable window and internal to said sidewall panel assembly.

15. The dimmable window assembly of claim 14, wherein the storage device includes one of:
   a battery, and
   an electrical capacitor.

16. The dimmable window assembly of claim 14, further comprising a housing for containing the energy storage device and the controller.

17. The dimmable window assembly of claim 14, further comprising a radio receiver for receiving wireless control signals used by the controller for controlling the opacity of the dimmable window.

18. The dimmable window assembly of claim 14, further comprising a set of passenger controls for generating control signals used by the controller to control the opacity of the dimmable window.

19. A sidewall panel assembly for aircraft, comprising:
   a sidewall panel assembly having at least one window opening therein;
   an electrically dimmable window mounted on the sidewall panel within the window opening;
   a seal comprising a boot surrounding the window opening and configured to seal an air gap between the dimmable window and an outer window of the aircraft;
   a pair of photovoltaic devices for converting ambient light into electrical power, placed in folds of the boot in the air gap; and,
   a controller for controlling the operation of the dimmable window using only electrical power produced by the photovoltaic device;
   all wiring associated with powering and controlling said dimmable window is associated only with said dimmable window and internal to said sidewall panel assembly.

20. The sidewall assembly of claim 19, further comprising a device for storing electrical power produced by the photovoltaic device.

21. The sidewall assembly of claim 19, wherein the controller includes:
   a set of manually operable passenger switches for selecting a dimming setting for the dimmable window, and
   a processor for controlling the electrical power delivered to the window based on the dimming setting selected by the passenger.

22. The sidewall assembly of claim 21, further comprising a radio receiver for wirelessly receiving remote control signals used by the processor to control the dimmable window.

23. The sidewall assembly of claim 19, further comprising:
   an inner window mounted within the window opening, inside of the dimmable window; and
   wherein at least one of the photovoltaic devices are placed on a non-vertical portion of the boot and substantially hidden from a line of sight of a person in an interior of the aircraft.

24. The sidewall assembly of claim 19, wherein the controller is mounted in a space between the sidewall panel and an outer skin of an aircraft.

* * * * *